US012096072B2

(12) United States Patent
Lei (10) Patent No.: US 12,096,072 B2
(45) Date of Patent: Sep. 17, 2024

(54) SYSTEMS AND METHODS FOR OFF-ROAD CONNECTIVITY AND SHARING OF TIME SENSITIVE WATCH INFORMATION

(71) Applicant: Ford Global Technologies, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 17/658,146

(22) Filed: Apr. 6, 2022

(65) Prior Publication Data
US 2023/0328315 A1   Oct. 12, 2023

(51) Int. Cl.
| | |
|---|---|
| H04N 21/442 | (2011.01) |
| G01C 21/36 | (2006.01) |
| G06V 40/10 | (2022.01) |
| H04N 21/414 | (2011.01) |
| H04W 4/024 | (2018.01) |
| H04W 4/21 | (2018.01) |
| H04W 4/40 | (2018.01) |
| H04W 4/46 | (2018.01) |

(52) U.S. Cl.
CPC ........... *H04N 21/44218* (2013.01); *G01C 21/3605* (2013.01); *G06V 40/10* (2022.01); *H04N 21/41422* (2013.01); *H04W 4/024* (2018.02); *H04W 4/21* (2018.02); *H04W 4/40* (2018.02); *H04W 4/46* (2018.02)

(58) Field of Classification Search
CPC ...... H04N 21/44218; H04N 21/41422; H04W 4/46; H04W 4/024; H04W 4/21; H04W 4/40; G06V 40/10; G01C 21/3605
See application file for complete search history.

(56) References Cited

U.S. PATENT DOCUMENTS

| | | |
|---|---|---|
| 10,202,115 B2 | 2/2019 | Stenneth |
| 10,354,265 B2 | 7/2019 | Patsiokas et al. |
| 10,730,512 B2 | 8/2020 | Kutila et al. |
| 2017/0238505 A1* | 8/2017 | Gordon .......... A01K 15/00 |

(Continued)

OTHER PUBLICATIONS

Daniel D. Olson et al., Monitoring Wildlife-Vehicle Collisions in the Information Age: How Smartphones Can Improve Data Collection, Open Access, PLOS One, vol. 9, Issue 6, e98613, Jun. 2014, 1-9.

(Continued)

*Primary Examiner* — James J Lee
*Assistant Examiner* — Steven Vu Nguyen
(74) *Attorney, Agent, or Firm* — Joseph Zane; Eversheds Sutherland (US) LLP (57) ABSTRACT

Systems and methods for off-road connectivity and sharing of time-sensitive information. Techniques described herein may be utilized to allow for off-road vehicles to share their animal watching information quickly with other off-road vehicles via vehicle-to-vehicle (V2V) and/or vehicle-to-everything (V2X) communications in real-time. Real-time watching information may be shared from off-road vehicles to one another, thereby enabling a more pleasant watching experience, as individuals are able to spend less time exploring and searching for wild animals and more time at points of interests where wild animals are expected to be seen based on information provided by other watchers.

20 Claims, 6 Drawing Sheets

(56) References Cited

U.S. PATENT DOCUMENTS

2019/0141948 A1\* 5/2019 Sawada ............... A01K 11/008
                                                                         340/573.3
2019/0162813 A1    5/2019 Price
2023/0166759 A1\* 6/2023 Yasuda .................. H04W 4/46
                                                                          701/23

OTHER PUBLICATIONS

S. Sharma et al., A Practical Animal Detection and Collision Avoidance System Using Computer Vision Technique, IEEE, 2169-3536, 2016, 1-13.

\* cited by examiner

SYSTEMS AND METHODS FOR OFF-ROAD CONNECTIVITY AND SHARING OF TIME SENSITIVE WATCH INFORMATION

BACKGROUND

Off-road vehicles may refer to vehicles that are designed for outdoor off-road driving in wild areas. In addition to being useful for day-to-day driving, off-road vehicles can be used to explore outdoor areas such as wilderness areas where there are wild animals in wild areas. Drivers and passengers alike may experience the excitement of spotting wild animals such as deer, horses, and more, which would be otherwise inaccessible to vehicles that lack sufficient off-road capabilities.

However, unlike typical road-based routing and navigation, it is not always assured that individuals will spot wild animals or other points of interest at the same location. The location and movement of wild animals is constantly changing, and information regarding the location of wild animals becomes stale quickly. Said another way, it is difficult to know with certainty where wild animals are located in an off-road environment. This results in various challenges for drivers of off-road vehicles who desire to see wild animals.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for off-road connectivity and sharing of time-sensitive information. Techniques described herein may be utilized to allow for off-road vehicles to share their animal watching information quickly with other off-road vehicles via vehicle-to-vehicle (V2V) and/or vehicle-to-everything (V2X) communications in real-time. Real-time watching information may be shared from off-road vehicles to one another, thereby enabling a more pleasant watching experience, as individuals are able to spend less time exploring and searching for wild animals and more time at points of interests where wild animals are expected to be seen based on information provided by other watchers.

Watching information may be shared by an off-road vehicle to a server and/or to other off-road vehicles in the nearby area. Information that is shared may include animal type, count of animals, time information, distance, head direction, and so forth. As noted above, this information may be shared with a central server that collects watching information from various off-road vehicles and the server can share watch information with other off-road vehicles in the same general area that may wish to know about the whereabouts of wild animals nearby.

More specifically, disclosed herein are systems and methods for animal watching and sharing among vehicles. For example, a vehicle may be in an off-road environment where wild life can be observed, and individuals in the vehicle may want to share the watch information to nearby vehicles.

An individual in the vehicle may input the animal watching information, such as the type of animal, location, etc. to the vehicle's (human-machine interface) HMI and select a "share" button to allow the customer to share the watching information, along with geolocation data and date and time, via a cellular vehicle-to-everything (C-V2X) module and to a server. The server may then relay the watch information to other vehicles in the area, providing information such as where the wild animals were most recently seen, a direction/heading of the animals, a predicted route by which vehicles in the area can reach the animals based on the respective vehicle's current positions and the animals' direction/heading information, and so forth. In some cases, vehicle-to-vehicle (V2V) communications are used to provide for direct communications between vehicles in the local area.

The watching information can be sent to a server through cellular network, and/or a V2V broadcast via a PC5 link. Other vehicles in the same wild area can receive the V2X broadcast message with watching information. They can also request a server to send watching information in this area. Other vehicles receive the watching information, and display this information on their HMI. This information may include, for example, animal watching location, time and date, head direction, number of animals, etc. The HMI can estimate the current location of the animal (based on last time reported, and head direction, etc.) and display as "estimated current location" with a different notation based on the heading of the animals, environmental (e.g., terrain) information. The customer can choose the animal watching they are interested, and drive towards the estimated current location. In this way, customers can spend more time enjoying animal watching and less time searching for animals to watch.

Figure 1:
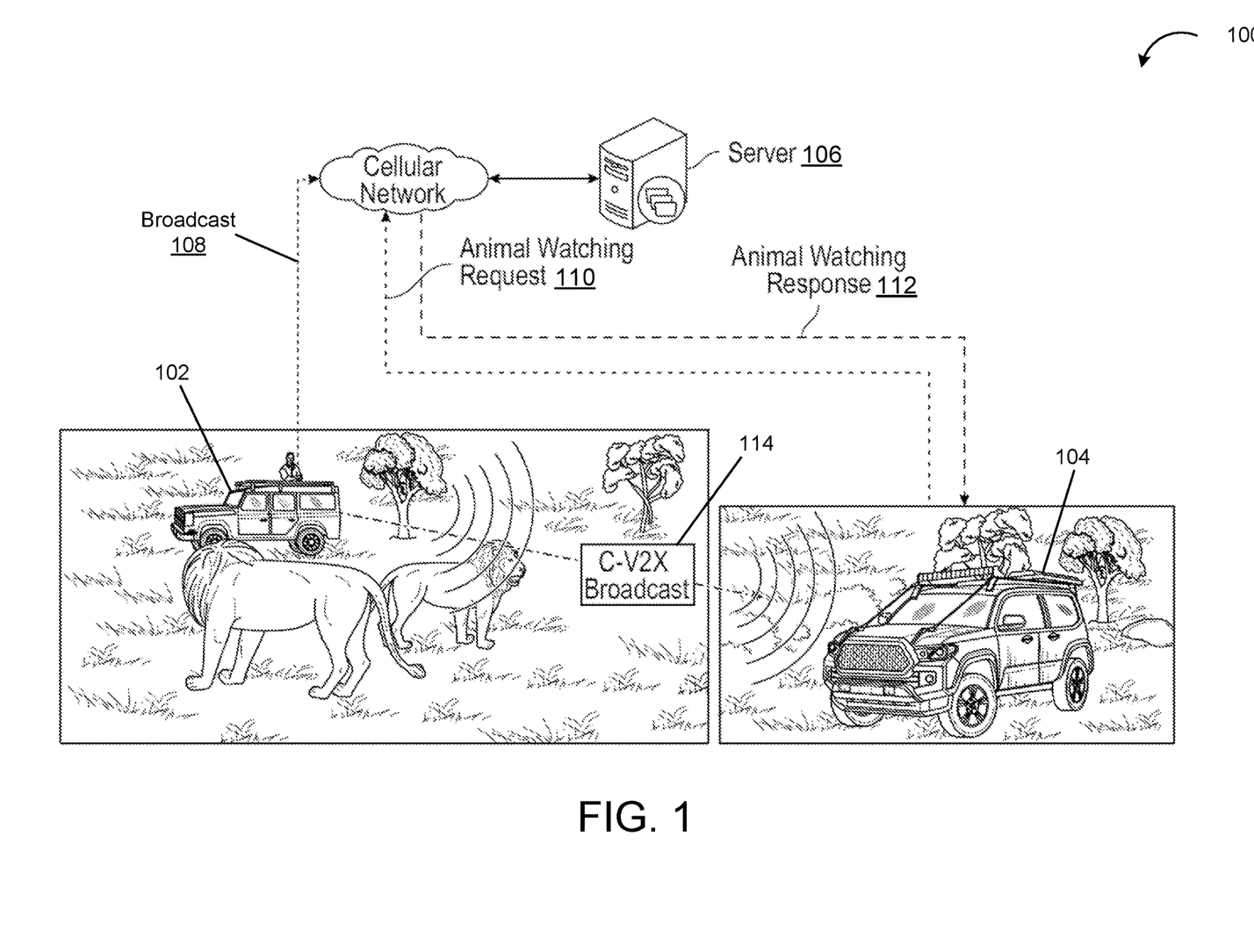
FIG. 1 illustrates an example environment in which various techniques for electric autonomous vehicle charging assistance may be implemented, according to at least one embodiment.

Cellular network depicted in FIG. 1 may refer to a non-limiting, illustrative example of a type of communications network that may be used by first vehicle 102 to communicate with server 106. Server 106 may be a remote server. Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), BluetoothQI, global positioning system (GPS), Wi-Fi, Wi-Max, ZigBee, ultrawideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Watch information may be broadcasted from first vehicle 102 to server 106. In various embodiments, watch information is shared with server 106 and/or second vehicle 104. Server 106 may refer to a computer server that first vehicle communicates with over a cellular network or other suitable wireless communications network. For example, a spectator may interact with a HMI of first vehicle 102 to provide watch information and then press a "Share" or "Send" button on the dashboard that then broadcasts the watch information to server 106. Server 106 may receive the watch information and store some or all watch information in a data store, such as a database of server 106. Server 106 may be operable to receive broadcasts from multiple vehicles and use a database to store several different types of watch information in real-time or near real-time conditions. Server 106 may refer to a machine or collection of machines, and may be implemented according to FIG. 6, for example.

Second vehicle 104 may refer to a different vehicle from first vehicle 102. Second vehicle 104, as depicted in the right-hand portion of FIG. 1, may be in a different location from first vehicle 102. Drivers and passengers of second vehicle 104 may be similar to those of first vehicle 102 in that they are also interested in exploring and seeing various topics of interest in an off-road environment. For example, users of vehicle 104 may be exploring a safari environment and may also be interested in seeing wild animals such as lions, birds, insects, trees, other natural sights, and other topics of interest. Second vehicle 104 may use vehicle-to-everything (V2X) communications to send an animal watching request 110 to server 106, and server 106 may provide an animal watching response 112. The animal watching response 112 may include watch information provided by the first vehicle 102, such as first location information of the one or more mobile animals, first heading information of the one or more mobile animals, and first time information associated with the first watch information.

First location information of the one or more mobile animals may refer to geolocation information of the wild animals. For example, GPS coordinates may be provided. For example, geolocation information of the animals may be determined based on the GPS coordinates of the car and then the distance and orientation of the animals may be measured to provide for accurate geolocation information. In some cases, the first location information may be approximated as the location of the first vehicle.

First heading information of the one or more mobile animals may refer to a heading or direction that the animals are facing. For example, consider an example (not depicted in FIG. 1) where a herd of elephants are migrating in a south-southwesterly direction. When viewers in the first vehicle spot the elephants, the direction and speed in which the elephants are moving may be important in providing actionable watch information, especially in cases where the animals are moving at a fast rate of speed. Heading information may be manually entered by users, but may also be determined by sensors attached to vehicles. For example, object detection and/or object tracking techniques may be used in connection with gyroscopes, accelerometers, GPS receivers, and the like to determine heading information. In some cases, heading information can be inferred through the heading of the vehicle. For example, if a herd of elephants is moving in a particular direction, first vehicle may drive alongside the herd at a safe distance. The heading of the vehicle may, in such cases and others, be used to infer to be the heading information of the animals.

First time information may refer to the time at which the animals are spotted. In various embodiments, time and/or location information is determined programmatically and automatically entered into the watch information by software of the HMI dashboard. For example, a clock module may be used to input the current time and a GPS receiver may be used to input the geolocation information.

Second vehicle 104 may receive some or all watch information as described above and use the watch information to determine the location of the lions depicted in the left-hand portion of FIG. 1. For example, if the watch information is related from first vehicle 102 to second vehicle 104 in real-time, then the second vehicle 104 may use a navigation system to chart a route to the location of the animals, as indicated by the watch information.

In various embodiments, first vehicle 102 transmits watch information directly to second vehicle 104, for example, using cellular vehicle-to-everything (C-V2X) broadcast 114 and/or vehicle-to-vehicle (V2V) broadcast via PC5 link.

In some embodiments, second vehicle 104 receives the watch information and displays information regarding the topic of interest on a corresponding HMI dashboard of the second vehicle 104. For example, when watch information is received by second vehicle 104, a graphical prompt or notification may be surfaced on the HMI dashboard presenting the driver and/or passengers of second vehicle 104 of a nearby topic of interest. The message may include various watch information, such as information relating to the type of animal, the count of animals, and so forth. For example, a prompt may say that there are two adult male lions spotted nearby and provide an intractable icon or object that can be selected and the navigation instructions are provided to the lions.

In various embodiments, the second vehicle 104 calculates a route to a topic of interest by attempting to find the quickest route to the location where the animals are located, according to the watch information. In some cases, the location of the animals, the location of the second vehicle, and the heading information of the animals is used to calculate a route. For example, consider an example in which watch information for a migrant herd of elephants is received by the second vehicle 104. Assume further that the second vehicle 104 is some distance away from the watch location such that a non-trivial amount of time would be required for second vehicle 104 to reach the watch location—for example, a 15 minute drive. Plotting a route to the current location of the migrant herd of elephants would be unhelpful, as it is likely that the elephants have already moved on. Accordingly, the heading of the elephants may be used to estimate where they are headed, and an appropriate manner in which the second vehicle 104 can reach the elephants.

In some embodiments, the heading information is also used to determine an appropriate heading information for the second vehicle 104 for watching. Consider again, the example of a migrant herd of elephants. If the migrant herd of elephants are heading in a direction that is generally directed towards second vehicle 104, then the second vehicle 104 may determine that driving directly towards the elephants is not the most desired route, even though it is the quickest route because the vehicle will be driving in a direction that is directly opposite of the animals, resulting in the viewers only having a short glimpse of the animals. Rather, the recommended route may be more circuitous and cause the vehicle to make a larger loop that causes the vehicle to turn around 180 degrees. This may result in a greater distance traveled, but results in the vehicle having the same heading as the migrant herd of elephants, allowing the passengers to enjoy the viewing experience for a longer time.

Figure 2:
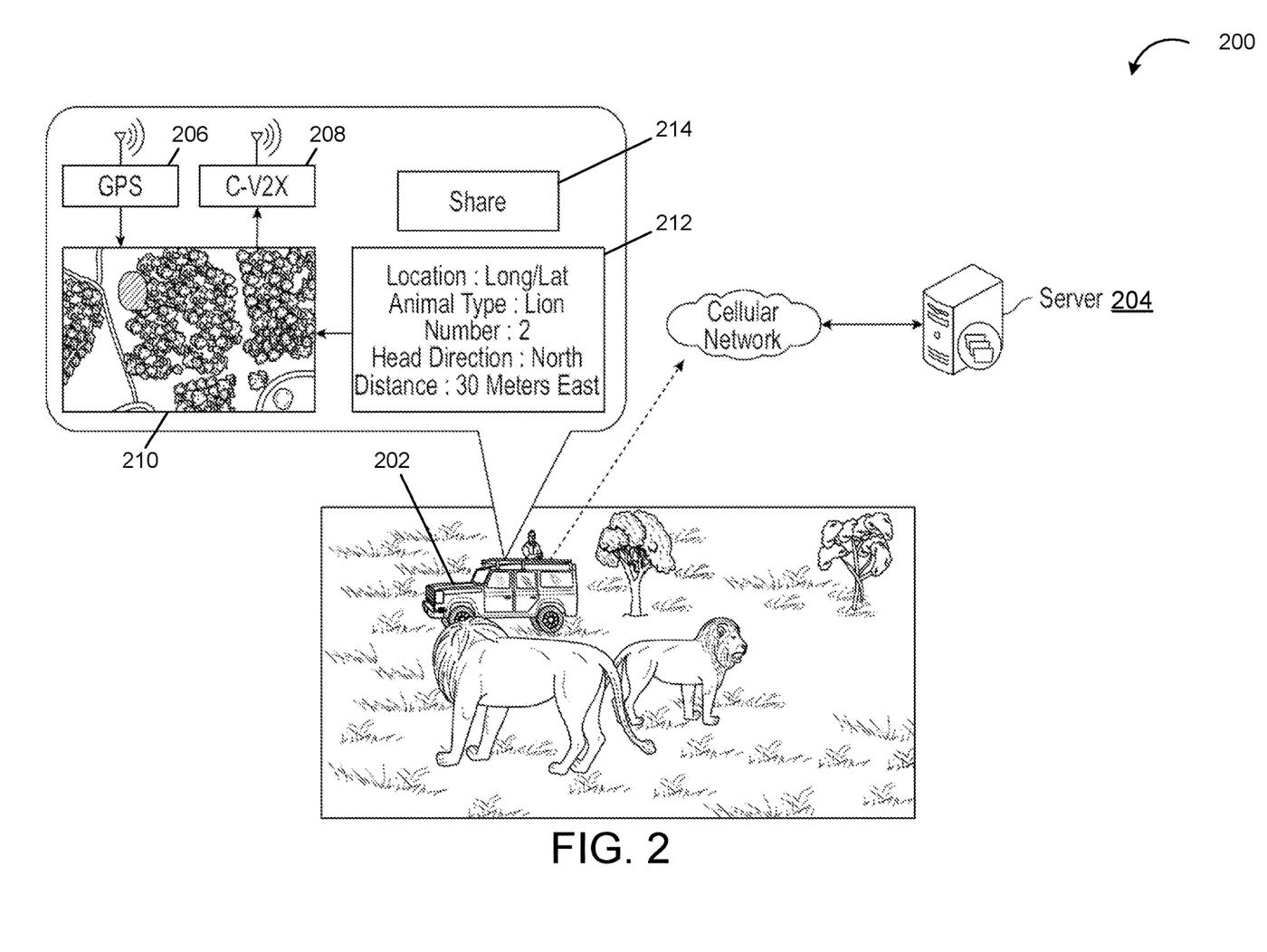
FIG. 2 depicts an illustrative environment in which a vehicle is able to broadcast watch information to a server, according to at least one embodiment.

FIG. 2 depicts an illustrative environment 200 in which a vehicle 202 is able to broadcast watch information to a server 204, according to at least one embodiment.

Vehicle 202 may refer to an off-road vehicle that includes sensors and communications equipment. Vehicle 202 may comprise global positioning satellite (GPS) 206 and cellular vehicle-to-everything (C-V2X) 208 components. When an individual sees a topic of interest such as lions, birds, insects, trees, other natural sights, etc., the individual may interact with a HMI dashboard to generate watch information that is shared with server 204 and/or other vehicles in the area. For example, direct vehicle-to-vehicle (V2V) communications may be used to share information between nearby vehicles.

A map 210 of the surrounding area may be generated and annotated with geolocation information regarding the watch event. For example, the location and/or heading of the topics of interest may be depicted on map 210. In some cases, the location of vehicle 202 is indicated on the map. In some embodiments, different icons are used to differentiate between vehicles and topics of interest.

Watch information 212 may include time-sensitive information regarding wild animals such as the lions depicted on the bottom portion of FIG. 2. Information regarding the watch event may be populated as watch information 212. For example, the individuals watching the lions may input the animal type, count of animals, heading information (e.g., head direction), and distance from the vehicle 202. For example, the distance "30 meters east" may be an approximate annotation of where the animals are relative to vehicle 202. Their absolute location may be determined based on the GPS coordinates of vehicle 202. Watch information 212 may include the location of the vehicle 202 expressed as GPS coordinates. For example, location information may be expressed as latitude, longitude, altitude information, or suitable combinations thereof (e.g., long/lat values). An HMI dashboard of vehicle 202 may include a share 214 icon that the individuals can interact with.

The user may input into a HMI dashboard of the vehicle 202 various watch information parameters. For example, the watch information may allow the user to input the animal type, count of animals, head direction, distance, current location, current time, and so forth. In some cases, these fields may be automatically populated—for example, a global navigation satellite system (GNSS) receiver such as a global positioning satellite (GPS) receiver may be used to automatically populate the user's current location, reducing the amount of information that the user fills in to the watch information. Additionally, time information can be determined by a clock module that tracks the current time. In some cases, sensors such as cameras attached to the vehicle 202 can be used to identify the animals—for example, computer vision or imaging techniques may be used to analyze video and/or still images of the lions to determine the number of lions, their gender, a particular genus or species, or other information that can be pre-populated into the watch information. Distance information may be estimated using various sensors such as infrared (IR) sensors or other sensors that can be used to measure the distance of the lions from the first vehicle 202. This may be especially useful in cases where the distance between the topics of interest is large. Users may have the opportunity to review information that is automatically pre-populated into the watch information. For example, users may be able to update the count of animals spotted in the area if sensors were not able to identify all of the animals in the area. A share 214 icon may be used to trigger the transmission of the watch information to server 204.

Figure 3:
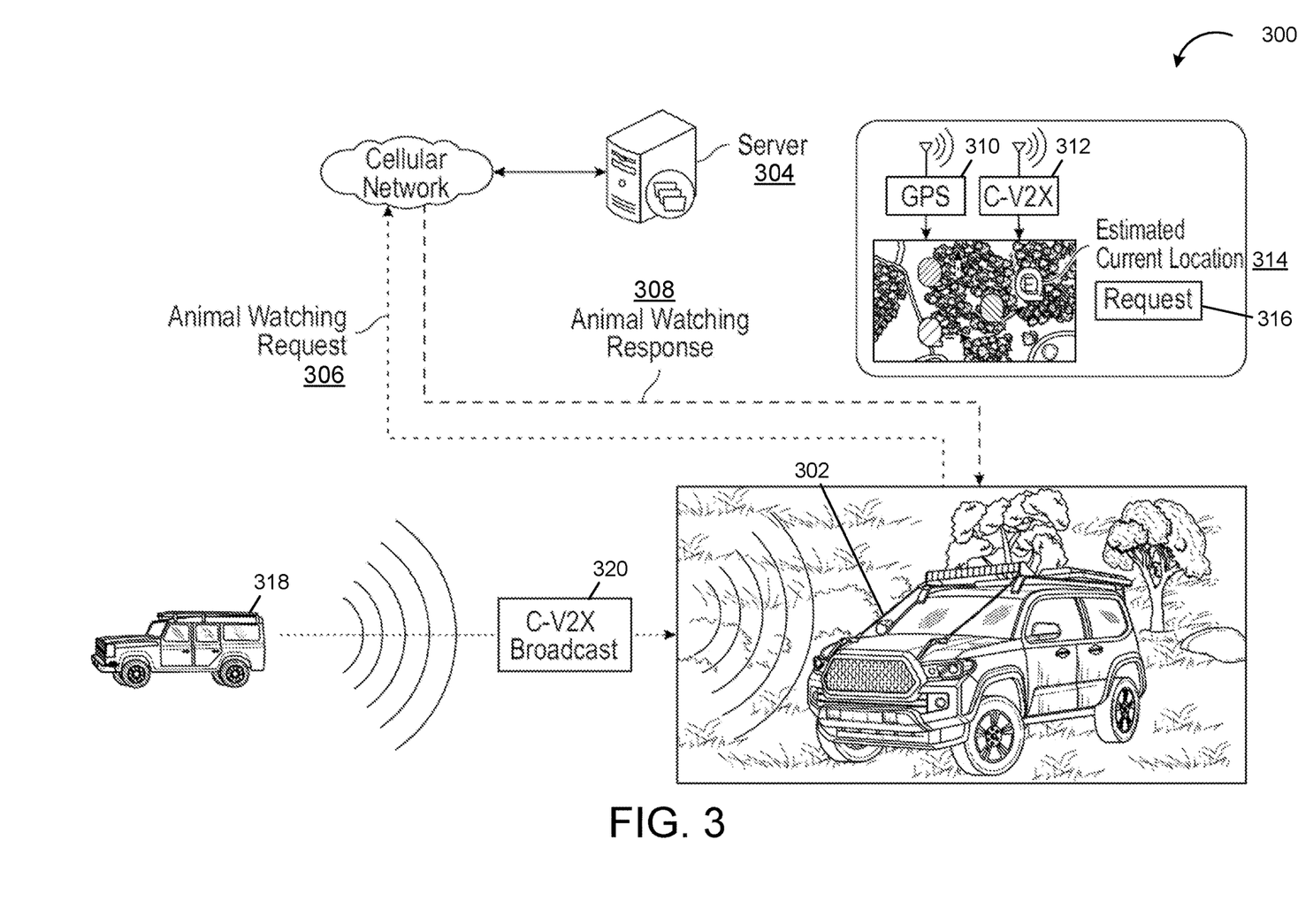
FIG. 3 depicts an illustrative environment in which a vehicle is able to receive watch information, for example, from a server, according to at least one embodiment.

FIG. 3 depicts an illustrative environment 300 in which a vehicle 302 is able to receive watch information, for example, from a server 304, according to at least one embodiment.

In various embodiments, vehicle 302 refers to an off-road vehicle with communications capabilities. The communications capabilities may refer to the ability to communicate with server 304 or other vehicles. Various scenarios involve a driver or other individuals of vehicle 302 wish to see wild animals, birds, insects, trees, other natural sights, etc., or other topics of interest. Vehicle 302 may include a HMI dashboard that users can interact with to receive watch information. The watch information may be provided in real-time from other nearby vehicles to provide vehicle 302 with information regarding where topics of interest may be spotted. For example, an animal watching request 306 may be transmitted over a cellular network to server 304 and an animal watching response 308 may be received in response to the request.

Vehicle 302 may refer to an off-road vehicle that includes sensors and communications equipment. Vehicle 302 may comprise global positioning satellite (GPS) 310 and cellular vehicle-to-everything (C-V2X) 312 components. Request and responses may be transmitted and received using C-V2X 312, for example. An HMI dashboard of vehicle 302 may be used to display a map with the vehicle's current location, the location of wild animals or topics of interest as per the watch information, and so forth. In some embodiments, estimated current location 314 of wild animals is displayed on the map. A "Request" button 316 may be included (e.g., as a physical button or touchscreen icon) that may be used to submit animal watching request 306. Estimated current location 314 may be computed based on data included in the watch information, including but not limited to location information of the wild animals and/or heading information of the wild animals.

Watch information may be used to calculate the estimated current location of the wild animals. For example, the location of the watch event may be used as a baseline estimated location. The estimated current location may be extrapolated based on the time of the watch even, the current time, and the heading information of the animals. For example, if two lions spotted heading due west at 10 miles per hour, then the estimated current location may be 5 miles west of the watch location if the animal watching response was received half an hour after the watch event. In various embodiments, topography information of an off-road environment is used to refine the estimated current location 314. For example, if map data indicates that there is a river that is 2 miles west of the lions, then the estimated current location may be somewhere along the eastern bank of the river rather than simply being 5 miles west (i.e., on the western side of the river).

In various embodiments, vehicle 302 calculates a route to a topic of interest by attempting to find a suitable route to the location where the animals are located, according to the watch information. In some cases, the location of vehicle 302, the location of the animals, and the heading information of the animals is used to calculate a suitable route. For example, consider an example in which watch information for a migrant herd of elephants is received by the vehicle 302. Assume further that the vehicle 302 is some distance away from the watch location such that a non-trivial amount of time would be required for vehicle 302 to reach the watch location—for example, a 15 minute drive. Plotting a route to the current location of the migrant herd of elephants may be unhelpful, as it is likely that the elephants have already moved on. Accordingly, the heading of the elephants may be used to estimate where they are headed, and an appropriate route by which the vehicle 302 can reach the elephants in motion.

In some embodiments, vehicle 318 transmits watch information directly to vehicle 302. For example, in some cases, communications with a server can be avoided by having vehicle 318 directly send watch information to nearby vehicles via a C-V2V broadcast 320 via a PC5 link.

Figure 4:
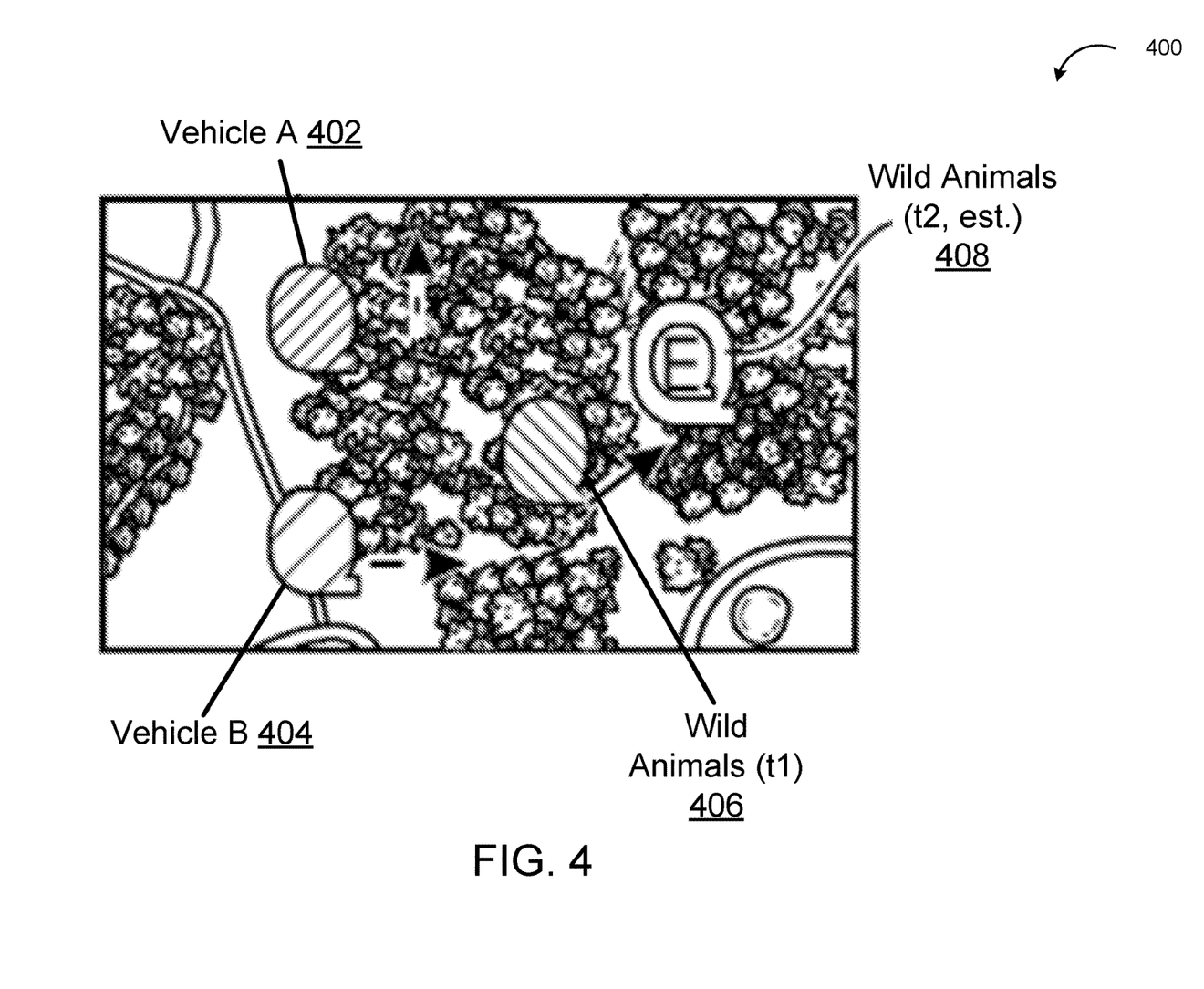
FIG. 4 depicts a diagram of an illustrative example in which an estimated current location of wild animals or other mobile topics of interests may be determined, according to at least one embodiment of the present disclosure.

FIG. 4 depicts a diagram 400 of an illustrative example in which an estimated current location of wild animals or other mobile topics of interests may be determined, according to at least one embodiment of the present disclosure.

Vehicle A 402 may refer to a first vehicle that take spots a wild animals at time t1 406. Vehicle A 402 may upload watch information at time t1 with location information of the wild animals 406 and heading information. The watch information, in some embodiments, is transmitted to a server (not shown in FIG. 4), and then vehicle B 404 receives the watch information from the server.

Vehicle B 404 may compute an estimated location of the wild animals at time t2 408. As described herein, t2 is some time after t1. The estimated location of the wild animals at time t2 may be calculated based on the location of the wild animals at t1 and their heading information. For example, in FIG. 4, the heading of the wild animals may be in a west-northwest direction. Vehicle B 404 may use the estimated location of the wild animals at time t2 408 to determine a route by which vehicle B 404 intercepts or is likely to intercept the wild animals. For example, vehicle B 404 may plot a navigation route from its current location to the estimated location of the wild animals at time t2 408. In some embodiments, such as where the distance between the location of vehicle B 404 at time t2 and the estimated location of the wild animals at time t2 408 is large, vehicle B 404 may compute a second estimated location of the wild animals at time t3>t2. This may be used to account for the fact that the wild animals, at time t2, are presently predicted to be at location 408, but that their estimated location by the time vehicle B 404 reaches location 408 will have changed.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. It must be understood that words such as "implementation," "scenario," "case," "application," and "situation" are to be understood as examples in accordance with the disclosure. It should be understood that the word "example" as used herein is intended to be non-exclusionary and non-limiting in nature.

FIG. 1 illustrates an example environment 100 in which various techniques for electric autonomous vehicle charging assistance may be implemented, according to at least one embodiment. FIG. 1 depicts a first vehicle 102, second vehicle 104, server 106, and more.

Environment 100 may refer to an off-road environment such as a safari environment. For example. FIG. 1 depicts an example in which a first vehicle 102 is nearby to two wild animals. The wild animals are depicted in FIG. 1 as lions, but any other suitable animals, birds, insects, trees, other natural sights, and so forth may be the topic of interest. Generally speaking, techniques described herein may be used to share watch information for various topics of interest, although the use of animals is provided in the figures as a non-illustrative example in which embodiments may be practiced.

As depicted in FIG. 1, within an off-road environment, passengers of first vehicle 102 may have be fortunate enough to see wild animals or other topics of interest, such as the blooming of rare and/or seasonal flowers, rare birds, and so forth. These topics of interest, generally speaking, may relate to rare or difficult-to-experience encounters that are of a time-sensitive nature. For example, the fact that one group of explorers spots a pack of lions at particular location does not guarantee that another group of explorers will also spot lions at the same location later in the same day, or the next day, or the next week, etc. Accordingly, the ability to share watch information regarding such topics of interest in a real-time manner or near real-time manner may be of great importance.

A human-machine interface (HMI) dashboard may be integrated into first vehicle 102. The HMI dashboard may include a graphical interface by which users can interact with the dashboard and input information using a touchscreen, keyboard, mice, or any other suitable other human interface device (HID). In various embodiments, drivers and/or passengers of first vehicle 102 explore an off-road environment (e.g., safari) in hopes of seeing animals, birds, insects, trees, other natural sights, and so forth may be the topic of interest. The location of such topics of interest may generally be unknown or difficult to ascertain in real-time, as such topics of interest may be mobile. For examples, the left-hand portion of FIG. 1 depicts first vehicle 102 and an individual that is fortunate enough to spot two lions. The two lions depicted on the left-hand portion of FIG. 1 may be considered topics of interest. When a user of first vehicle 102 spots the lions, the user may experience a once-in-a-lifetime experience and wish to share this experience with others. In various embodiments, a user is able to interact with HMI dashboard to share time-sensitive watch information relating to the topic of interest—in this case, sharing information to others that two lions were spotted at a particular location.

The user may input into a HMI dashboard of the first vehicle 102 various watch information parameters. For example, the watch information may allow the user to input the animal type, count of animals, head direction, distance, current location, current time, and so forth. In some cases, these fields may be automatically populated—for example, a global navigation satellite system (GNSS) receiver such as a global positioning satellite (GPS) receiver may be used to automatically populate the user's current location, reducing the amount of information that the user fills in to the watch information. Additionally, time information can be determined by a clock module that tracks the current time. In some cases, sensors such as cameras attached to the first vehicle 102 can be used to identify the animals—for example, computer vision or imaging techniques may be used to analyze video and/or still images of the lions to determine the number of lions, their gender, a particular genus or species, or other information that can be pre-populated into the watch information. Distance information may be estimated using various sensors such as infrared (IR) sensors or other sensors that can be used to measure the distance of the lions from the first vehicle 102. This may be especially useful in cases where the distance between the topics of interest is large. Users may have the opportunity to review information that is automatically pre-populated into the watch information. For example, users may be able to update the count of animals spotted in the area.

A user may submit watch information from first vehicle 102 to server 106 via a broadcast 108. The broadcast 108 may refer to a transmission of one or more electronic messages (e.g., data packets) from a cellular vehicle-to-everything (C-V2X) module of first vehicle 102 to server 106 via a cellular network.

Figure 5:
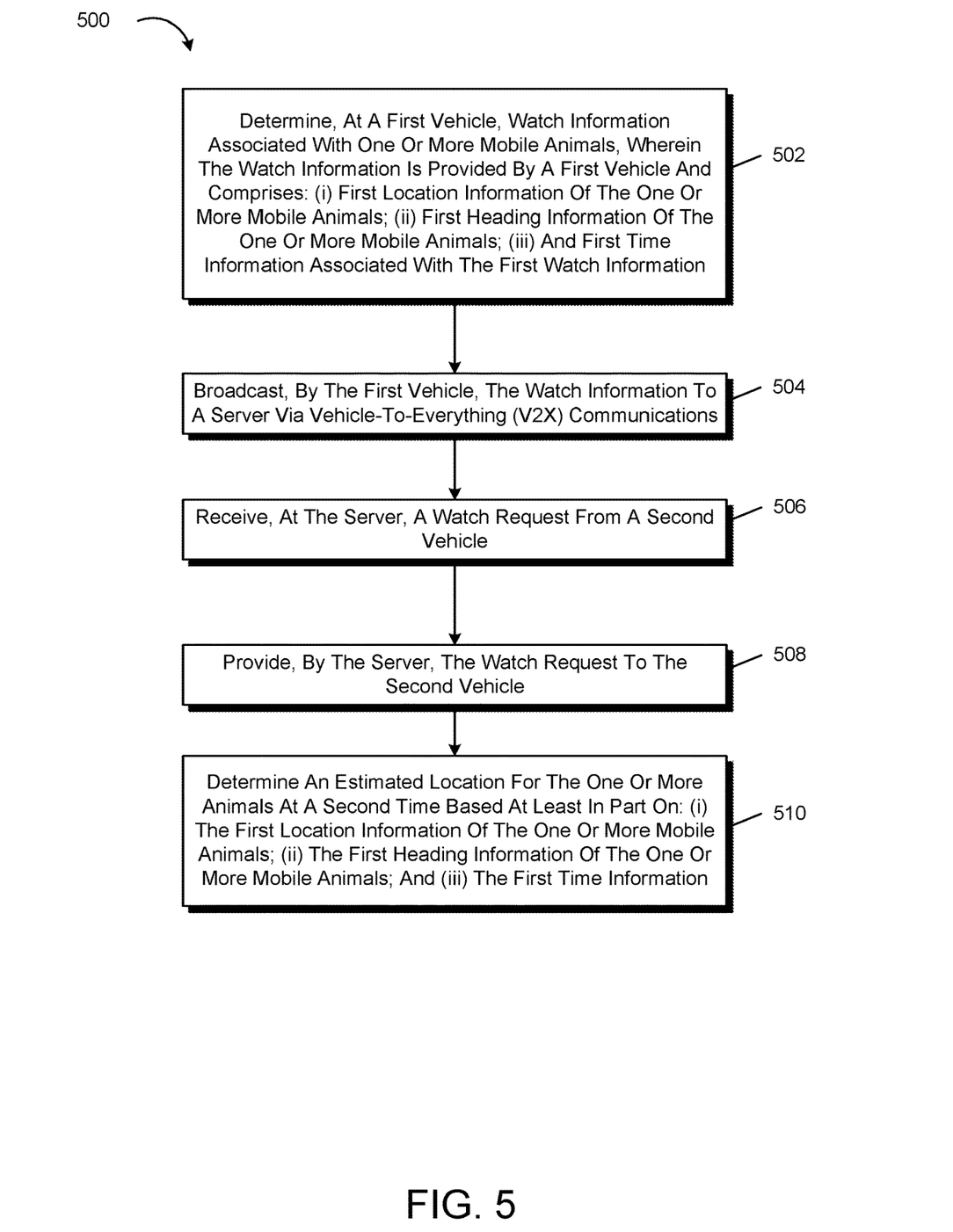
FIG. 5 shows an illustrative example of a process for off-road connectivity and sharing of time-sensitive watch information, in accordance with one or more example embodiments of the present disclosure.

FIG. 5 shows an illustrative example of a process 500 for off-road connectivity and sharing of time-sensitive watch information, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1-4 and/or 6. In at least one embodiment, process 500 or a portion thereof is implemented by vehicles, servers, and the like, described in connection with FIG. 1.

In at least one embodiment, process 500 comprises a step to determine, at a first vehicle, watch information associated with one or more mobile animals, wherein the watch information is provided by a first vehicle and comprises: (i) first location information of the one or more mobile animals; (ii) first heading information of the one or more mobile animals; (iii) and first time information associated with the first watch information 502. In some embodiments, the first watch information further comprises first geolocation information of the first vehicle. The vehicle may be an off-road vehicle in an off-road environment. The watch information may further comprise a count of the one or more mobile animals.

In at least one embodiment, process 500 comprises a step to broadcast, by the first vehicle, the watch information to a server via vehicle-To-everything (V2X) communications 504. In at least one embodiment, process 500 comprises a step to receive, at the server, a watch request from a second vehicle 506. In at least one embodiment, process 500 comprises a step to provide, by the server, the watch request to the second vehicle 508. In some embodiments, the first vehicle provides the watch information directly to nearby vehicles in proximity to the mobile animals via vehicle-to-vehicle (V2V) broadcast. This may be done in place of or in conjunction with server communications.

In at least one embodiment, process 500 comprises a step to determine an estimated location for the one or more animals at a second time based at least in part on: (i) the first location information of the one or more mobile animals; (ii) the first heading information of the one or more mobile animals; and (iii) the first time information 510. In some embodiments, the watch information relates to a watch event that occurred at time t1 and the watch information is received by the second vehicle at a later time t2. The second vehicle may, at or near time t2, determine its current GPS coordinates and determine a navigation route to reach the wild animals at a second estimated location of the one or more animals at an even later third time t3 that is after the second time t2. The navigation route may be determined based at least in part on topography information of an off-road environment. For example, if map data indicates that there is a river nearby that wild animals are heading towards, then the estimated location of the animals may be along the river bank, especially if a determination is made that it is infeasible or unlikely that the animals would cross the river.

Figure 6:
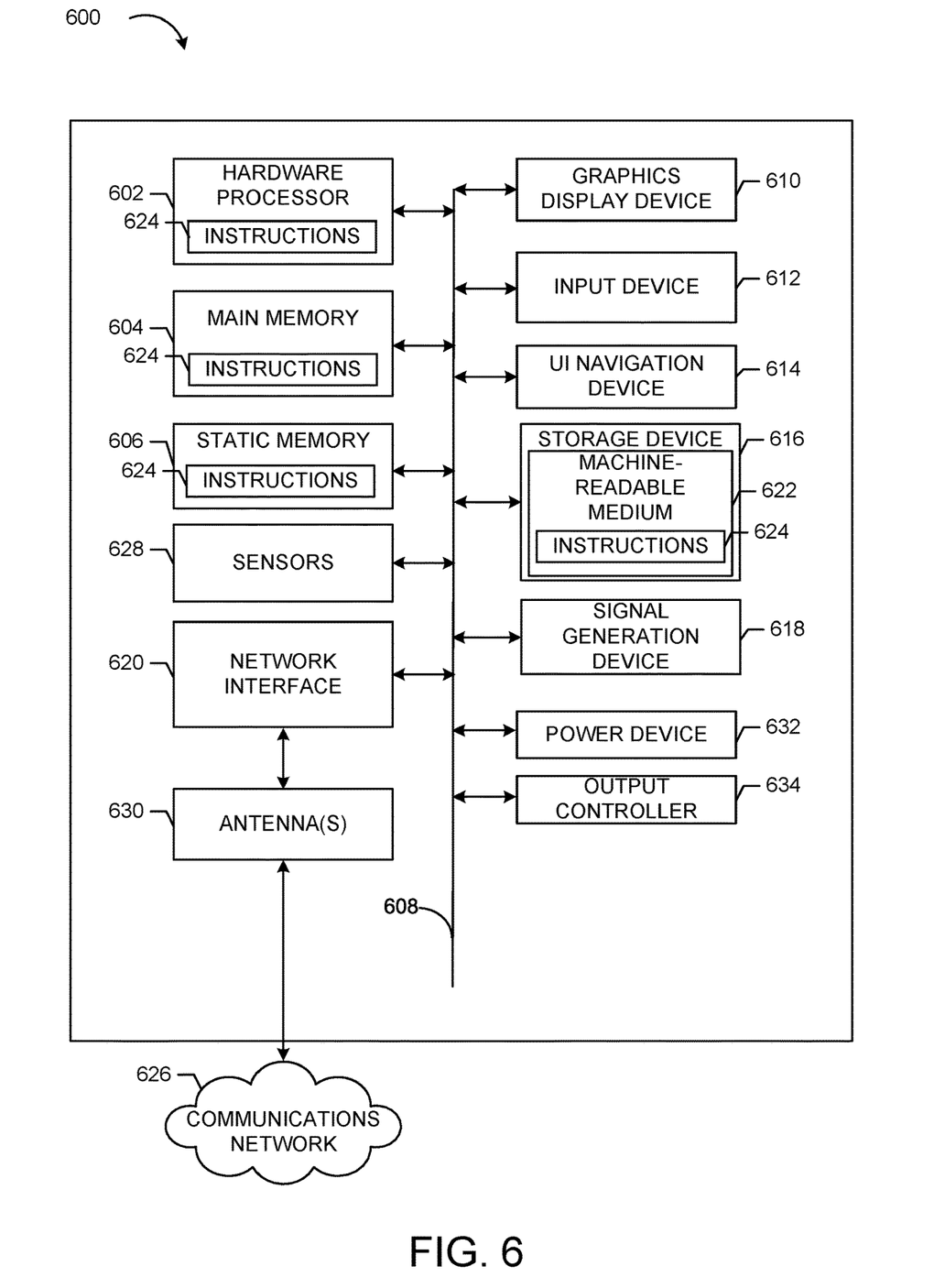
FIG. 6 illustrates a block diagram of an example of a machine or system upon which any one or more of the techniques (e.g., methodologies) discussed herein may be performed.

The machine (e.g., computer system) 600 may include any combination of the illustrated components. For example, the machine 600 may include a hardware processor 602 (e.g., a central processing unit (CPU), a graphics processing unit (GPU), a tensor processing unit (TPU) including an artificial intelligence application-specific integrated circuit (ASIC), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a data signal), a network interface device/transceiver 620 coupled to antenna(s) 630, and one or more sensors 628, such as a sound detecting sensor (e.g., a microphone), accelerometers, magnetometers, location sensors, and the like. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining first watch information associated with one or more mobile animals, wherein the first watch information is provided by a first vehicle and comprises:
   first location information of the one or more mobile animals;
   first heading information of the one or more mobile animals; and
   first time information associated with the first watch information;
   receiving a request for the watch information from a second vehicle;
   determining an estimated location for the one or more animals at a second time based at least in part on:
   the first location information of the one or more mobile animals;
   the first heading information of the one or more mobile animals; and
   the first time information; and
   providing the estimated location to the second vehicle.

2. The method of claim 1, wherein the first watch information further comprises first geolocation information of the first vehicle.

3. The method of claim 1, further comprising:
   determining second geolocation information for the second vehicle at the second time; and
   determining a navigation route for the second vehicle to reach a second estimated location of the one or more animals at a third time that is after the second time.

4. The method of claim 3, wherein the navigation route is determined based at least in part on topography information of an off-road environment.

5. The method of claim 1, wherein the watch information further comprises a count of the one or more mobile animals.

6. The method of claim 1, further comprising:
   providing the watch information from the first vehicle to the second vehicle via vehicle-to-vehicle (V2V) broadcast.

7. The method of claim 6, wherein the first vehicle sends the watch information to a plurality of vehicles in proximity to the mobile animals, wherein the plurality of vehicles comprises at least the second vehicle.

8. The method of claim 1, wherein:
   the watch information associated with the one or more mobile animals is provided to a server by the first vehicle; and
   the watch information associated with the one or more mobile animals is provided by the server to the second vehicle.

9. A system, comprising:
   one or more processors; and
   memory storing executable instructions that, as a result of execution by the one or more processors, cause the one or more processors to:
   determine watch information associated with one or more mobile animals, wherein the watch information is provided by a first vehicle and comprises:
   first location information of the one or more mobile animals;
   first heading information of the one or more mobile animals; and first time information associated with the first watch information;
receive a request from a second vehicle for the first watch information;
determine an estimated location for the one or more animals at a second time based at least in part on:
the first location information of the one or more mobile animals;
the first heading information of the one or more mobile animals; and
the first time information; and
provide the estimated location to the second vehicle.

10. The system of claim 9, wherein the first watch information further comprises first geolocation information of the first vehicle.

11. The system of claim 9, wherein the executable instructions include further instructions that, as a result of execution by the one or more processors, cause the one or more processors:
determine second geolocation information for the second vehicle at the second time; and
determine a navigation route for the second vehicle to reach a second estimated location of the one or more animals at a third time that is after the second time.

12. The system of system of claim 11, wherein the navigation route is determined based at least in part on topography information of an off-road environment.

13. The system of claim 9, wherein the watch information further comprises a count of the one or more mobile animals.

14. The system of claim 9, wherein the executable instructions include further instructions that, as a result of execution by the one or more processors, cause the one or more processors to:
receive a subscription request from the second vehicle to be notified when other vehicles are in close proximity to the second vehicle have provided watch information; and
provide the watch information to the second vehicle based at least in part on the subscription request.

15. The system of claim 9, wherein the estimated location is provided to the second vehicle based at least in part on the second vehicle being in close proximity to the first vehicle.

16. A method comprising:
at a first vehicle:
receiving, via a first human-machine interface (HMI) dashboard, watch information associated with one or more mobile animals, wherein the watch information is provided by a first vehicle and comprises:
first location information of the one or more mobile animals;
first heading information of the one or more mobile animals; and
first time information associated with the first watch information;
receiving a request for the watch information from a second vehicle; and
providing the watch information to the second vehicle; and
at a second vehicle:
receiving the watch information;
determine an estimated location for the one or more animals at a second time based at least in part on:
the first location information of the one or more mobile animals;
the first heading information of the one or more mobile animals; and
the first time information; and
presenting the estimated location on a second human-machine interface (HMI) dashboard of the second vehicle.

17. The method of claim 16, wherein the first watch information further comprises first geolocation information of the first vehicle.

18. The method of claim 16, further comprising:
determining second geolocation information the second vehicle at the second time; and
determining a third estimated location for the one or more animals at a third time, wherein an estimated navigation time indicates the second vehicle is able to reach the third estimated location by the third time.

19. The method of claim 16, wherein the estimated location is determined based further at least in part on topography information of an off-road environment.

20. The method of claim 16, wherein the watch information further comprises a count of the one or more mobile animals.

* * * * *